(12) United States Patent
Wiggs

(10) Patent No.: US 7,938,904 B1
(45) Date of Patent: May 10, 2011

(54) CEMENTITIOUS GROUT AND METHODS OF USING SAME

(75) Inventor: B. Ryland Wiggs, Franklin, TN (US)

(73) Assignee: B. Ryland Wiggs, Franklin, TN (US)

( * ) Notice: Subject to any disclaimer, the term of this patent is extended or adjusted under 35 U.S.C. 154(b) by 1240 days.

(21) Appl. No.: 11/363,777

(22) Filed: Feb. 28, 2006

Related U.S. Application Data

(60) Provisional application No. 60/656,967, filed on Feb. 28, 2005.

(51) Int. Cl.
   *C04B 14/06* (2006.01)
   *C04B 14/34* (2006.01)
(52) U.S. Cl. ......... 106/713; 106/716; 106/718; 106/737
(58) Field of Classification Search .............. 106/713, 106/716, 718, 737
   See application file for complete search history.

(56) References Cited

U.S. PATENT DOCUMENTS

| | | | |
|---|---|---|---|
| 4,912,941 A | 4/1990 | Buchi | 62/260 |
| 6,251,179 B1 | 6/2001 | Allan | 106/719 |
| 6,280,521 B1 * | 8/2001 | Carter, Jr. | 106/724 |
| 6,569,235 B2 * | 5/2003 | Carter, Jr. | 106/724 |
| 6,860,936 B2 * | 3/2005 | Carter, Jr. | 106/718 |

OTHER PUBLICATIONS

EP 340414 (Groche) Nov. 8, 1989 abstract only.*
DE 3633413 (Klein et al.) Mar. 24, 1988 abstract only.*
IN 65280 (Mehta) Jun. 8, 1960 abstract only.*

* cited by examiner

*Primary Examiner* — Paul Marcantoni
(74) *Attorney, Agent, or Firm* — Miller, Matthias & Hull LLP

(57) ABSTRACT

A cementitious Grout 111MG, with improved thermal and electrical conductivity over Grout 111, for use in at least one of geothermal heat pump systems and metal electrical grounding rod systems, with improved conductivity achieved by means of substituting metal grit for sand, a cementitious grout where both Grout 111MG and Grout 111 have mix water pH level limitations so as not to be corrosive to metals, a new use for Grout 111 as a fill material surrounding electrical grounding rods for enhanced electrical conductivity over traditional grouts, and a new use where both Grout 111MG and Grout 111 may be utilized to surround at least one of geothermal heat pump sub-surface heat transfer fluid conductive tubing/piping and electrical grounding rods installed within at least one of a well/borehole, a trench, and a pit.

4 Claims, 5 Drawing Sheets

CEMENTITIOUS GROUT AND METHODS OF USING SAME

CROSS-REFERENCES TO RELATED APPLICATIONS

This application is a Non-Provisional Utility application which claims benefit of co-pending U.S. Patent Application Ser. No. 60/656,967 filed Feb. 28, 2005, entitled "Grout 111MG and Methods of Using Same" which is hereby incorporated by reference.

A portion of the disclosure of this patent document contains material that is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

STATEMENT REGARDING FEDERALLY SPONSORED RESEARCH OR DEVELOPMENT

Not Applicable

REFERENCE TO SEQUENCE LISTING OR COMPUTER PROGRAM LISTING APPENDIX

Not Applicable

BACKGROUND OF THE INVENTION

The present invention relates to an improved sub-surface grouting material for use as at least one of a thermally conductive fill material and an electrically conductive fill material, as well as new and useful applications for the use of conventional Grout 111.

Grouts comprised of various mixtures of bentonite clay, sand, water, and the like, are commonly used to fill the void, and poorly conductive, spaces in boreholes/wells, after tubing has been inserted into the boreholes/wells, so as to provide at least one of a thermally conductive and an electrically conductive means with the surrounding ground. Thermally conductive grouts are typically utilized to fill the voids in the wells/boreholes of geothermal heat pump systems so as to promote heat transfer to and from the heat transfer fluid circulating within closed-loop tubing from and to the surrounding ground, depending on whether the heat pump system is operating in the cooling or the heating mode. A special, highly thermally conductive, cementitious grout, commonly referred to as "Grout 111", was developed for this purpose, as more fully described in U.S. Pat. No. 6,251,179 B1 to Allan, the disclosures and claims of which are fully incorporated herein by reference. This grout has improved thermal conductivity, improved bond strength, and decreased permeability, all of which are desirable properties for heat transfer purposes. Grout 111 attains a thermal heat transfer rate of 1.4 Btu/hr. ft. degree F.

Also, U.S. Pat. No. 4,912,941 to Buichi teaches a method of extracting thermal energy from the earth via using a thermally conductive grout mixture of water and cement, together with one or more of a siliceous gel and finely divided metal powder. The thermally conductive grout mixture taught by Buichi is one or more of a siliceous gel and a finely divided metal powder, preferably silver and/or copper and/or aluminum powder. The substance, in fluid form, is used for pressure grouting into the crevices of artificially fissured rock (created by blasting and flushing), where it solidifies into a heat conductive plug within the (see U.S. Pat. No. 4,912,941 to Buchi, column 1, line 40 through column 2, line 22).

However, it is important to note that the thermally conductive grout mixture taught by Buchi is not for geothermal heating/cooling applications, and is not for the purpose of enhancing the sub-surface heat exchange line in a geothermal heat pump system application. In a geothermal heat pump system application, whether a water-source system or a direct expansion/direct exchange system (which systems are well understood by those skilled in the art) the heat transfer fluid is circulated within a supply and a return pipe/tube, and it is critical that the grout surrounding the sub-surface heat transfer fluid containment piping/tubing be as thermally conductive as possible. To the contrary, Buchi expressly teaches that it is important to lose as little heat as possible during the ascent of the hot transmission medium in the return pipe, which pipe, at least in its upper reaches (upwards of 1,500 meters deep) is thermally insulated via a special steel, asbestos-cement, or synthetic resin (see U.S. Pat. No. 4,912,941 to Buchi, column 2, line 43 through column 2, line 48). Further, Buchi teaches how to solely extract heat, principally via steam or hot water (see column 2, lines 49 through 56) from depths of more than 1,500 meters to preferably 5,000 meters (see column 1, lines 52 through 54). Buchi' design is never intended for the earth to act as a heat sink, as would be the case in a reverse-cycle geothermal heat pump system, and is not intended for applications less than 1,500 meters deep (typically geothermal heat pump systems operate at depths down to about 300 feet deep).

Thus, the teachings of Buchi, which require injecting materials into artificially created fissures in rock, at depths of at least 1,500 meters, so as to solely supply very hot water or steam, together with an insulated return line, would not be apparent to those working with reverse-cycle geothermal heat pump systems at typical depths of 300 feet, or less, which typically utilize the ground as both a heat source and a heat sink, which require a heat conductive fill material to surround the sub-surface heat transfer line for mostly the entire length of the sub-surface heat transfer containment tubing/piping, and which do not intentionally create, flush out, and re-fill, lateral fissures in deep rock. Further, while Buchi teaches the use of water and cement mixed with a preferable silver, copper, or aluminum powder, Buchi overlooks the facts that the surface of silver and copper quickly oxidize, which oxidized surface inhibits heat transfer, that a powdered metal will result in almost a maximum oxidation impairment, and that aluminum does not mix well with cement.

Geothermal heat pump systems are commonly comprised of "water-source" systems, which exchange heat to and from the ground to water, then to a refrigerant, and finally to interior air, and of Direct eXchange, also commonly referred to as "Direct eXpansion" (herein abbreviated as "DX") systems, which exchange heat to and from the ground to a refrigerant, and then to the interior air. Since DX systems have one-third fewer heat transfer steps and do not require a water circulator pump, DX systems are typically more efficient than water-source heat pumps. As mentioned, the specific differences between water-source heat pumps and DX heat pumps are well understood by those skilled in the art.

The sub-surface heat transfer tubing utilized in geothermal heat pumps may be installed in at least one of a hole/borehole/well, a trench, and a pit. A hole/borehole is typically drilled, and may reach depths of about 300 feet. A trench is typically dug via a trencher to a depth of about 4 to 5 feet. A pit is typically dug via a front end loader or an excavator to a depth of about 4 to 5 feet. However, the fill material immediately surrounding the heat transfer tubing in at least one of a trench and a pit type installation has historically been one of natural soil and/or sand and/or powdered limestone.

Most common grouts used for heat transfer purposes in conjunction with geothermal heat pump applications are comprised of various mixtures of bentonite clay, sand, and water, absent cement. The absence of cement makes the grouts easier to pump via less expensive pumping equipment. Such common clay-based grouts without cement typically attain heat transfer rates of only 0.69 to 1.2 Btu/hr. ft. degree F., with the heat transfer rate being adversely affected as the grout is dried out via heat pump system operation in the cooling mode. Dried, clay-based, grouts tend to significantly loose heat transfer abilities and also tend to shrink and pull away from sub-surface geothermal heat transfer tubing, leaving non-heat conductive void areas. For example, a moist clay would have a heat transfer rate in the range of 0.64 Btu/hr. ft. degree F., while a dry bentonite clay would have a heat transfer rate in the range of 0.1 Btu/hr. ft. degree F.

While the aforesaid Grout 111 was developed for geothermal heat transfer purposes, it was, in reality, primarily developed for use in conjunction with water-source geothermal heat pump purposes, as evidenced via the disclosures of the aforesaid Grout 111 at U.S. Pat. No. 6,251,179 B1. Specifically, this is because water-source geothermal heat pump systems virtually always utilize a plastic, high density, polyethylene ("HDPE") piping within which to circulate a water and/or a water/antifreeze fluid mixture for sub-surface heat exchange purposes. This plastic tubing is virtually impervious to common underground conditions, such as sulfur water, etc., that may be corrosive to copper tubing, which copper tubing is virtually always used to circulate a refrigerant fluid for sub-surface DX system heat exchange purposes.

Therefore, since the claims of the said Grout 111 patent are intended for use with HDPE piping in a water-source geothermal heat pump system application, they do not in any way restrict the type of water to be utilized in the grouting formula, other than a common sense reference that the water should be potable, not having excessive impurities, but with absolutely no mention being made of pH level requirements, (see U.S. Pat. No. 6,251,179 B1 to Allan, column 6, lines 30 through 34). However, this lack of pH level restriction, in a DX system application, could be catastrophic, resulting in sub-surface refrigerant transport tubing deterioration and leaks, as sulfur water, water with a pH level below 5.5, and water with a pH level above 11, and the like, can be corrosive to copper. Thus a means to improve the water formula for inclusion in a Grout 111 mix would be preferable for a DX system application.

Also, a means to improve the heat conductivity for a Grout 111 mix would additionally be preferable for both a DX system and a water-source system geothermal heat pump application. Both DX and water-source geothermal heat pump systems commonly utilize U loops in vertically oriented wells/boreholes, to circulate a heat exchange fluid into and out of the wells/boreholes, while exchanging heat with the naturally occurring sub-surface temperatures. The U loops in a DX geothermal heat pump system are typically comprised of copper tubing, which transport a refrigerant heat exchange fluid. The U loops in a water-source geothermal heat pump system are typically comprise of plastic HDPE tubing, which commonly transport a water/anti-freeze heat exchange fluid.

Additionally, common bentonite clay-based grouts, absent any cement, are typically utilized for electrically conductive purposes to fill the void areas surrounding holes drilled for grounding rods, such as the grounding rods used by utility companies, radio transmission towers, and the like. Grounding rods are typically comprised of a single, solid, metal rod, (not U bends of tubing, as in the case of geothermal heat pump systems) with the metal typically comprised of copper, or the like. Common clay-based grouts are typically utilized for such electrically conductive purposes because the industry as a whole has been more concerned with simply filling the void spaces in grounding rod boreholes than in developing a method to both fill the borehole voids and to simultaneously increase electrical conductivity, which would be preferable. Increasing the electrical conductivity of grouts used to fill grounding rod boreholes will increase the protective qualities of the grounding rods, helping to better insure excessive and undesirable electrical currents, such as from lightening strikes for example, are fully and completely directed into the ground and away from buildings, people, computers, transmitters, equipment, and the like. Further, it would be preferable to utilize a cementitious grout, with a low moisture permeability, to surround metal grounding rods so as to at least one of help avoid poor conductivity during periods when clay-based grouts may tend to dry out, and so as to additionally help to protect the metal grounding rods from premature deterioration caused by soil conditions potentially corrosive to metals.

BRIEF SUMMARY OF THE INVENTION

It is an object of the present invention to provide at least one of an enhanced thermally conductive grouting material, an enhanced electrically conductive grouting material, and a safer water specification for grouting material used in conjunction with at least one of DX systems utilizing metal sub-surface refrigerant transport tubing and electrical grounding systems utilizing metal grounding rods. Additionally, it is an object of the present invention to teach a new application method for the use of conventional Grout 111, namely, to be used for enhanced electrical conductivity purposes as a fill material surrounding electrical grounding rods. Further, it is an object of the present invention to teach the use of a highly conductive cementitious grout application for surrounding at least one of sub-surface geothermal heat transfer tubing and grounding rods situated in the ground in at least one of a well/borehole, a trench, and a pit. The present invention provides a solution to these preferable objectives, as hereinafter more fully described.

Specifically, the thermal conductivity of Grout 111, for use in conjunction with any geothermal heat pump system may be improved by substituting metal grit in lieu of silica sand. The metal grit should preferably have the same particle size range as the sand in Grout 111, as specified in U.S. Pat. No. 6,251,179 B1 to Allen, column 1, lines 56 through 67, and in column 2, lines 1 through 10, (in Table 1), which is incorporated herein by reference. The volume/mass of the metal grit should preferably equal the same volume/mass of the sand it replaces in a conventional Grout 111 mixture. However, depending on the type of metal grit utilized, the weight of the metal grit in comparison to the weight of the sand it replaces will vary. A thicker metal grit is preferable over a finer powdered metal because a grit reduces the amount of metal surface area subject to oxidation when a metal prone to oxidation is utilized, such as steel, for example. Further, the greater the thickness of the solid metal bits, the better the heat transfer because of less gaps between the metal fragments, subject, of course, to the maximum particulate gradation size which helps to insure the other positive qualities of conventional Grout 111. Better, a preferable metal grit would be comprised of a heat conductive metal that is not prone to oxidation and that mixes well with cement, such as at least one of stainless steel, magnesium, titanium, or the like.

Whenever a metal grit is substituted for sand, the particular metal's weight, in comparison to the weight of sand, must be taken into account to help insure the grout is thoroughly and evenly mixed prior to, and during, installation. This may require the utilization of mixing/pumping equipment with greater capacities than that required for conventional Grout 111, as will be readily apparent to those skilled in the art of pumping cementitious grouts.

The heat conductivity of the Grout 111 formulation, with some amount of metal grit substituted for the silica sand, herein referred to as Grout 111MG (the "MG" is an abbreviation for "metal grit") will increase proportionately to the amount of metal grit substituted for sand in proportionate relationship to the heat conductivity of the metal type utilized. For example, utilizing heat transfer rates expressed in BTUs/ Ft. Hr. degrees F., common steel (absent negative oxidation affects) has a heat transfer rate of about 26, while copper (absent negative oxidation affects) has a heat transfer rate of about 227. These may be compared with a dry, high silica content, sand which has a heat transfer rate of about 0.184, and with water saturated sand, which has a heat transfer rate of about 1.44.

While increasing the heat conductivity surrounding the heat conductive sub-surface geothermal transport tubing/piping is of less importance when the surrounding geology has a heat conductivity equal to, or less than, conventional Grout 111's 1.4 heat conductivity rate (such as water saturated silt and/or clay, which has a heat conductivity rate of about 0.96), increasing the heat conductivity rate is of considerable importance when the surrounding geology has a heat transfer rate greater than Grout 111 (such as in limestone and marble which have heat transfer rates of about 3.3, and such as sandstone, which has a heat transfer rate of about 4.5). The greater the heat transfer rate, the less the requisite excavation and/or well/borehole depth, and the lower the installation cost.

Further, increasing the heat transfer and/or conductivity rate of Grout 111 is always of importance when a grout fill material is utilized to enhance electrical conductivity surrounding electrical grounding rods. This is because the enhanced electrically conductive grout additionally provides an expanded surface area within which to dissipate the unwanted electrical charge into the ground.

Of course, simply utilizing the conventional Grout 111 for the purpose of an enhanced electrically conductive fill material surrounding sub-surface electrical grounding rods will result in a significant improvement over the common current industry practice of merely utilizing at least one of a bentonite clay-based fill material and a concrete/cement-based fill material (such as neat cement), which all have lower electrical conductivity rates than Grout 111. Consequently, in lieu of utilizing the preferred metal grit enhanced Grout 111MG, conventional Grout 111 should preferably be utilized as an alternative in lieu of other conventional, less conductive, grout fill materials for the purpose of a fill material surrounding electrical grounding rods if Grout 111MG is not available.

As is well understood by those skilled in the art, sub-surface heat transport tubing/piping, as well as electrical grounding rods, are typically installed via inserting same into pre-drilled wells/boreholes in the ground. The well/boreholes are typically vertically oriented, but may be angled/sloped. Once inserted into place, the open areas surrounding the tubing/piping/rods are then filled with a heat/electrically conductive grout material. Typically, the grout material is pumped into the well/borehole from the bottom to the top, so as to help insure all air gaps and void spaces are completely filled and that conductivity is maximized to the extent possible, solely depending on the heat/electrical conductivity rate of the particular grout utilized.

An alternative method of installing sub-surface heat transport tubing/piping, as well as electrical grounding rods, is to install same in at least one of a horizontally oriented and a sloped trench, which may be dug via a trencher, a back-hoe, or the like, the excavation/digging of which is well understood by those skilled in the art, typically at a reduced cost over drilling vertically oriented wells/boreholes. In such an alternative method of installation, rather than simply backfilling the tubing/piping/rods with natural soil and/or powdered limestone, or the like, as is commonly done, thermal and electrical conductivity will be enhanced via placing the tubing/piping/rods adjacent to, and preferably via surrounding the tubing/piping/rods within, at least one of conventional Grout 111 and Grout 111MG, with Grout 111MG being preferred for the above-stated reasons.

Yet another alternative method of installing sub-surface heat transport tubing/piping, as well as electrical grounding rods, is to install same, via inter-connected tubing/piping/rods, in at least one of a horizontally oriented and a sloped pit, which may be dug via a front end loader, an excavator, a back-hoe, or the like, the excavation/digging of which is well understood by those skilled in the art, also typically at a reduced cost over drilling vertically oriented wells/boreholes. In such an alternative method of installation, rather than simply backfilling the tubing/piping/rods with natural soil and/or powdered limestone, or the like, as is commonly done, thermal and electrical conductivity will be enhanced via placing the tubing/piping/rods adjacent to, and preferably via surrounding the tubing/piping/rods within, at least one of conventional Grout 111 and Grout 111MG, with Grout 111MG being preferred for the above-stated reasons.

Lastly, another alternative method of installing sub-surface heat transport tubing/piping, as well as electrical grounding rods, is to install same in a combination comprised of at least one of a horizontally oriented and a sloped trench, a horizontally oriented and a sloped pit, and a well/borehole. In such an alternative method of installation, thermal and electrical conductivity will be enhanced via placing the tubing/piping/rods adjacent to, and preferably via surrounding the tubing/piping/rods within, at least one of conventional Grout 111 and Grout 111MG, with Grout 111MG being preferred for the above-stated reasons.

Thus, while the conventional Grout 111 patent (U.S. Pat. No. 6,251,179 B1 to Allan) limits its claims to those of backfilling a hole/borehole/well with cementitious grout for purposes of surrounding a U bend used for a geothermal heat pump system application, at least one of Grout 111 and Grout 111MG may be utilized to at least one of thermally/electrically contact, and to thermally/electrically surround, at least one of the sub-surface tubing/piping of a geothermal heat pump system used for transmission of a heat exchange fluid for geothermal heat exchange purposes, and the subsurface metal rod of an electrical grounding system used for dissipating unwanted electrical currents into the ground/earth, wherein the at least one of the tubing/piping and rods is within at least one of a well/borehole, a trench, and a pit. For example, the subsurface tubing/piping/rods may be installed within both a trench and a well, both a trench and a pit, or may be installed in any combination of the three, as well as in only a trench, or in only a pit, as opposed to only in a hole/borehole/well.

When at least one of Grout 111 and Grout 111MG is utilized for a grout intended to surround at least one of metal refrigerant fluid transport tubing in a DX system application and a metal electrical grounding rod, it is very important that the water utilized in the grout mixture be comprised of water with a pH between 5.5 and 11. Otherwise, the acidic water (below a 5.5 pH) or the basic/alkaline water (above an 11 pH) may contribute to deteriorating the metal tubing or the metal rod. Further, sulfur water should not be utilized in any Grout 111 mix, or in any Grout 111MG mix for the same reason of a potential contribution to deteriorating at least one of the metal fluid transport tubing and the metal grounding rod. Thus, when referencing a pH chart, with a scale from 1 to 14, with 1 being the most acidic and with 14 being the most basic/alkaline, in all Grout 111MG and Grout 111 formulations intended for DX heat pump system applications and for metal grounding rod system applications, the water used in the formulation mix must be within the safe range between 5.5 and 11.

In all cases where at least one of metal refrigerant fluid transport tubing in a DX system application and a metal electrical grounding rod in an electrical grounding rod system application is utilized, at least one of a hole, a well/borehole, a trench, and a pit must be provided in the ground; the at least one of metal refrigerant fluid transport tubing in a DX system application, and a metal electrical grounding rod in an electrical grounding rod system, must be inserted into the at least one of a hole, a well/borehole, a trench, and a pit; a cementitious grout comprising a cement, water, a superplasticizer, and at least one of silica sand and metal grit, must be in contact with at least one of metal refrigerant fluid transport tubing in a DX system application and a metal electrical grounding rod in an electrical grounding rod system application; and the cementitious grout must cure (typically curing for at least for 24 hours, with 48 hours being preferred). Depending on the intended use of the conductive grout for either heat transfer in a geothermal heat pump application, or for electrical conductivity in an electrical grounding system application, the same conductive grout formulation can serve either use, with Grout 111MG being the preferred conductive grout, and with Grout 111 being the preferable alternative if Grout 111MG is not available.

Generally, the cementitious grout is inserted into the ground under high pressure via a cementitious grout pump. However, when a metal grit is substituted for silica sand, and the metal grit is heavier than the sand, a stronger, greater capacity, high pressure pump must be utilized than that for pumping a cementitious grout comprised of lighter silica sand alone, as may be readily calculated by those skilled in the art of pumping cementitious grout. To assist in the installation and augmented flow rate of a cementitious grout through a trimme tube (a grout insertion tube), a chemical commonly referred to as a superplasticizer is commonly added to the mixture. Any appropriate superplasticizer may be utilized for purposes of the subject invention, such as a sulfonated naphthalene, a melamine, or the like, as would be well understood by those skilled in the art.

BRIEF DESCRIPTION OF THE SEVERAL VIEWS OF THE DRAWINGS

There are shown in the drawings embodiments of the invention as presently preferred. It should be understood, however, that the invention is not limited to the simple exemplary arrangements and instrumentalities shown in the drawings, wherein.

DETAILED DESCRIPTION OF THE INVENTION

The following detailed description is of the best presently contemplated mode of carrying out the invention. The description is not intended in a limiting sense, and is made solely for the purpose of illustrating the general principles of the invention. The drawings are not necessarily drawn to scale. The various features and advantages of the present invention may be more readily understood with reference to the following detailed description taken in conjunction with the accompanying drawings.

Figure 1:
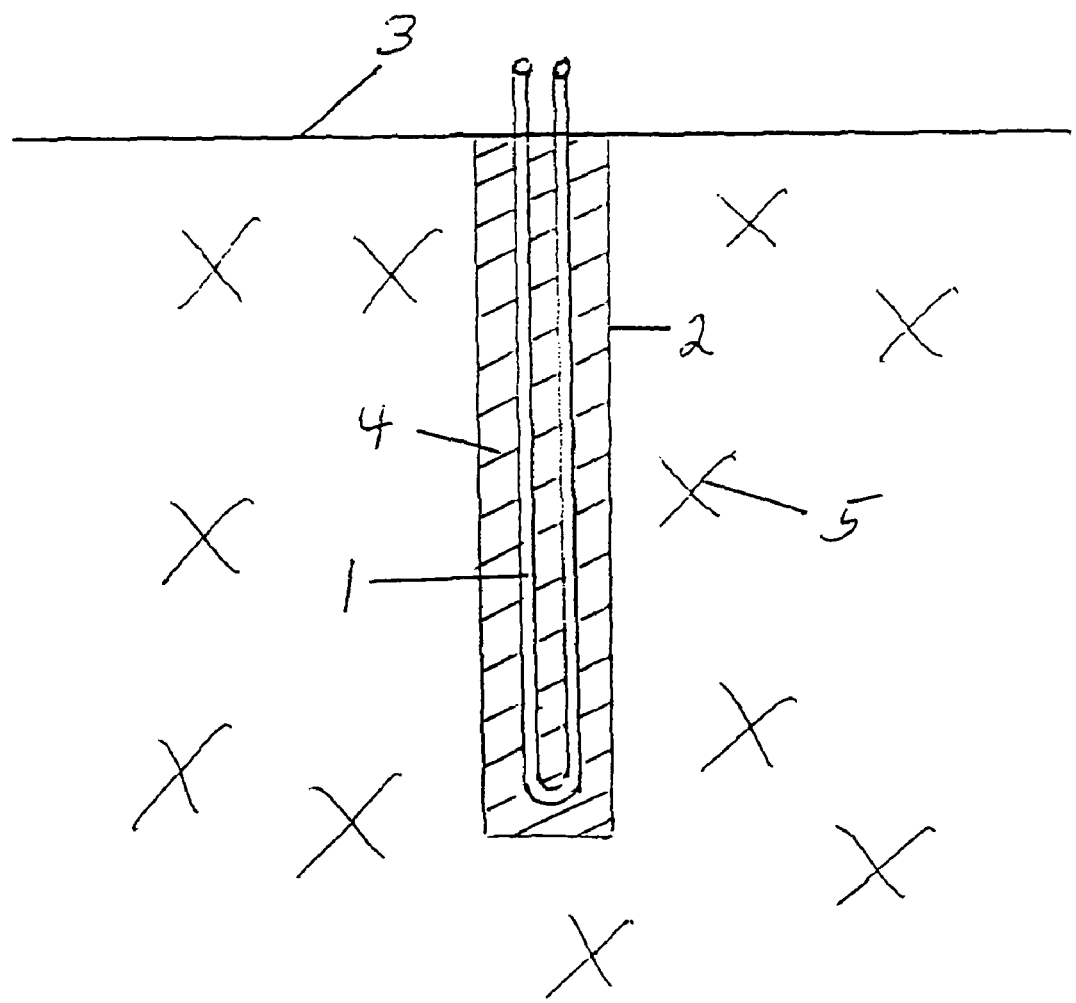
FIG. 1 is a side view of a geothermal heat pump system U loop within a well/hole/borehole. After the U loop has been inserted, the remaining empty void space within the hole has been filled with a heat conductive cementitious grout, preferably such as Grout 111MG, to effect good geothermal heat transfer with the adjacent and surrounding earth.

Referring now to the drawings in detail, where like numerals refer to like parts or elements, there is shown in FIG. 1 a side view of a U loop 1 within a well/hole/borehole 2. The U loop 1 is comprised of at least one of a plastic tubing/piping (typically used with water-source heat pump systems, which systems are well understood by those skilled in the art) and a metal tubing/piping (typically used in conjunction with DX heat pump systems, which systems are well understood by those skilled in the art), which tubing/piping is used to transport a heat conductive fluid (not shown herein) for purposes of geothermal heat transfer in conjunction with a geothermal heat pump system (not shown herein as both water-source and DX geothermal heat pump systems are well understood by those skilled in the art). The space below the ground surface 3, between the exterior wall of the U loop 1 and the interior wall of the well/hole/borehole 2, is filled with a heat conductive grout 4, which is preferably Grout 111MG, which heat conductive grout 4 is in direct thermal contact with the adjacent and surrounding earth 5.

Figure 2:
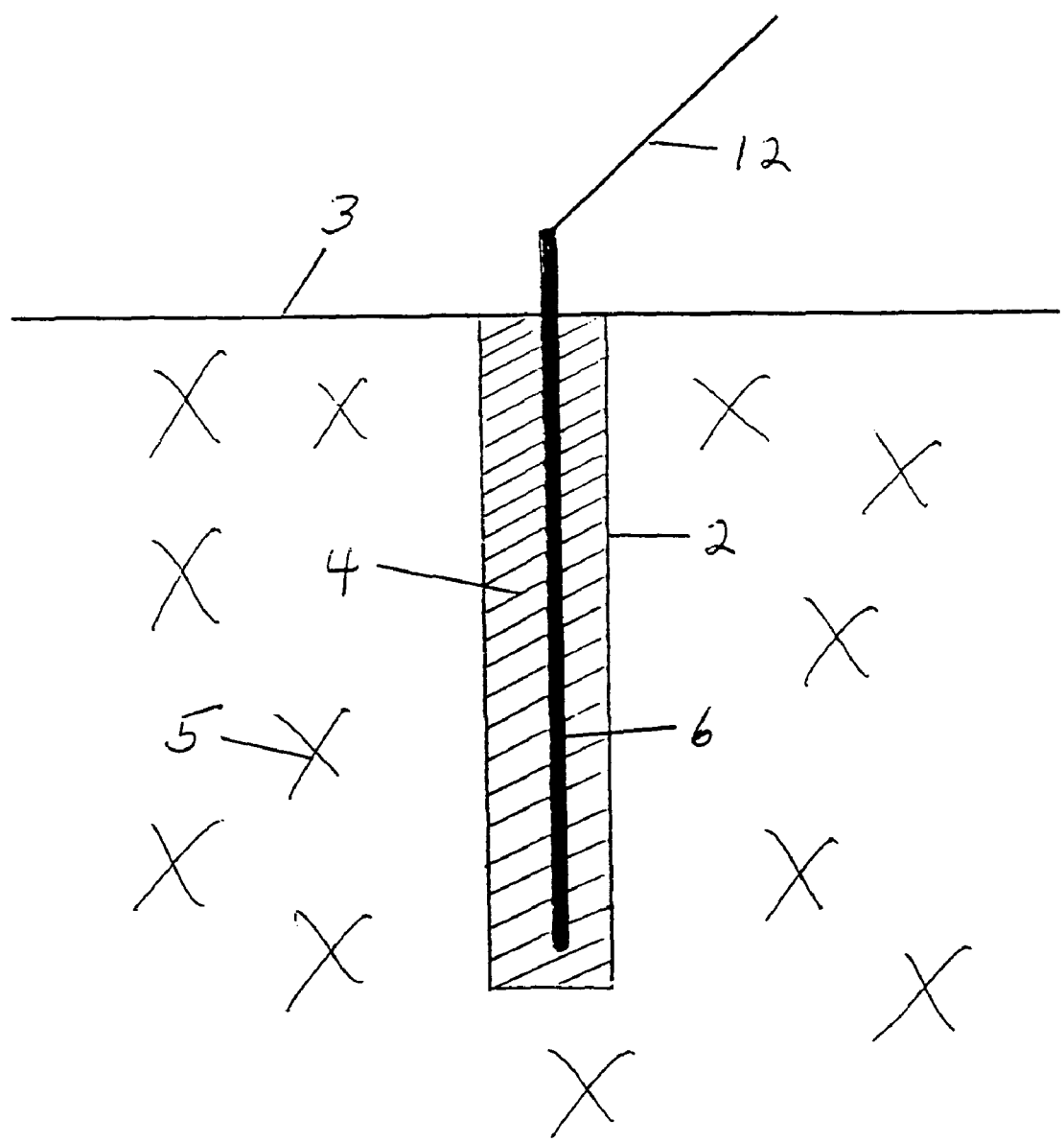
FIG. 2 is a side view of a metal grounding rod within a well/hole/borehole. After the metal grounding rod has been inserted, the remaining empty void space within the hole has been filled with an electrically conductive cementitious grout, preferably such as Grout 111MG, to effect good geothermal electrical transfer with the adjacent and surrounding earth.

FIG. 2 is a side view of a metal grounding rod 6 within a well/hole/borehole 2. The metal grounding rod 6 is comprised of an electrically conductive metal, such as copper, or the like, which metal grounding rod 6 is used to conduct and transmit unwanted electrical currents (not shown herein) into the earth 5 and away from protected structures and equipment (not shown herein). The unwanted electrical currents are transmitted to the metal grounding rod 6 by means of an electrical conducting wire 12, as is well understood by those skilled in the art. The space below the ground surface 3, between the exterior wall of the metal grounding rod 6 and the interior wall of the well/hole/borehole 2, is filled with an electrically conductive grout 4, which is preferably Grout 111MG, which electrically conductive grout 4 is in direct thermal contact with the adjacent and surrounding earth 5. The heat conductive grout 4, as shown in FIG. 1 above, is also the same electrically conductive grout 4, as shown herein in FIG. 2. Depending on the intended use of the conductive grout 4 for either heat transfer in a geothermal heat pump application, or for electrical conductivity in an electrical grounding system application, the same conductive grout 4 formulation can serve either use, with Grout 111MG being the preferred conductive grout 4, and with Grout 111 being the preferable alternative if Grout 111MG is not available.

Figure 3:
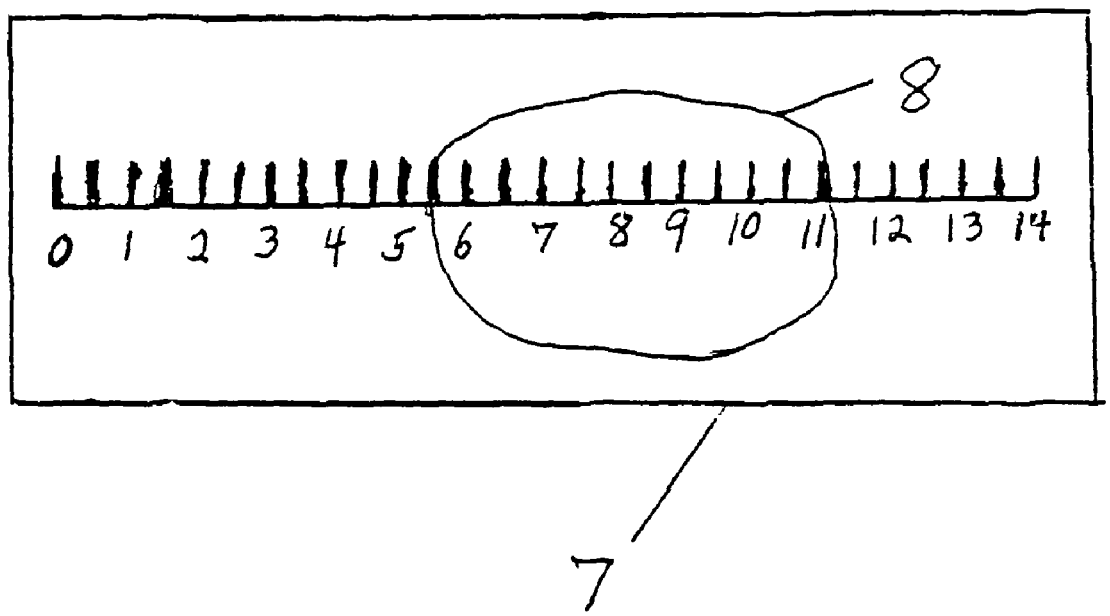
FIG. 3 is a front view of a pH chart. In all Grout 111MG and Grout 111 formulations intended for DX heat pump system applications and for metal grounding rod system applications, the water used in the formulation mix must be within 5.5 and 11 pH range.

FIG. 3 is a front view of a pH chart 7, from 1 to 14, with 1 being the most acidic and with 14 being the most basic/alkaline. In all Grout 111MG and Grout 111 formulations intended for DX heat pump system applications and for metal grounding rod system applications, the water used in the formulation mix must be within the circled range 8 between 5.5 and 11.

Figure 4:
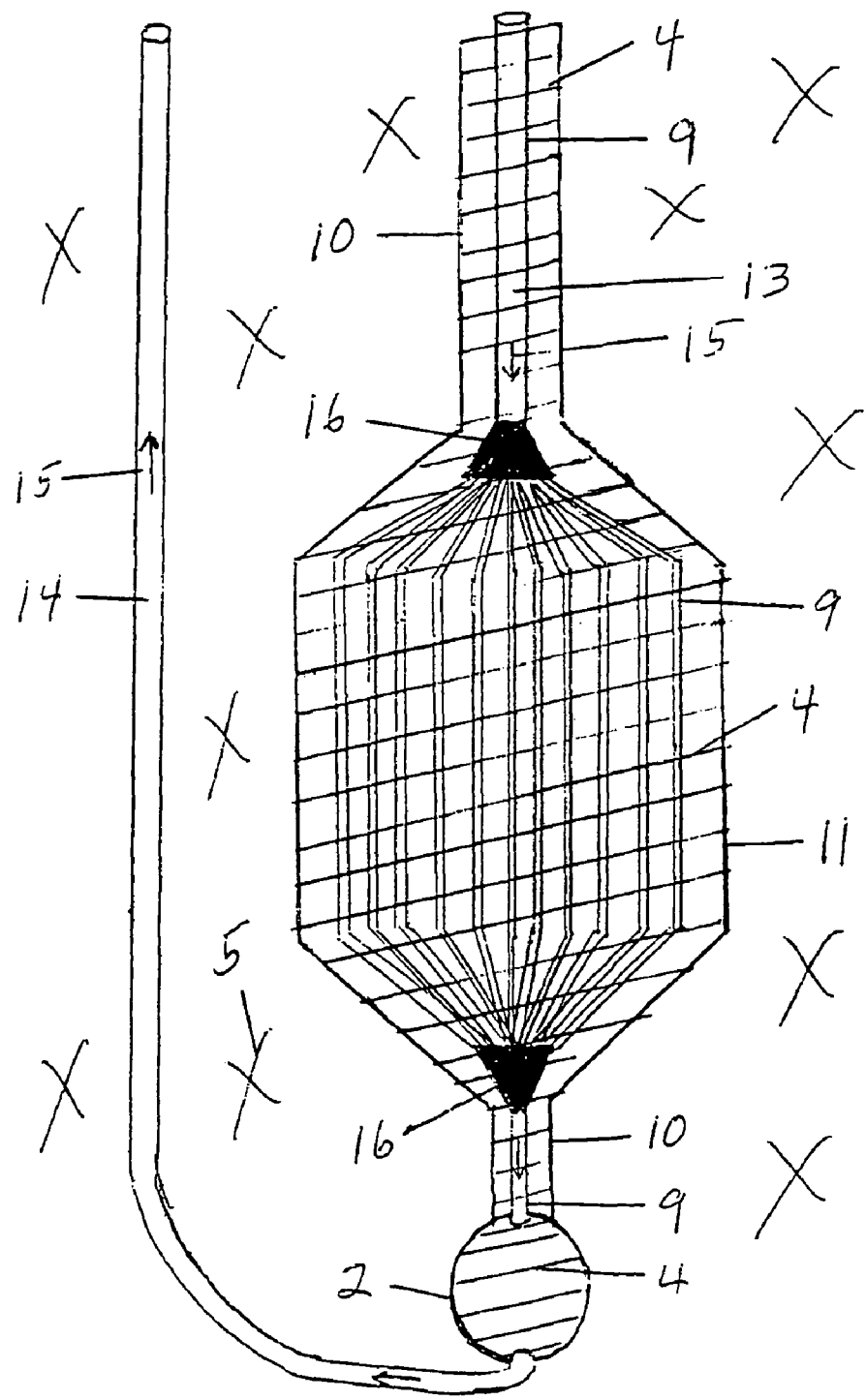
FIG. 4 is a top view of the sub-surface tubing/piping of a geothermal heat pump system used for transmission of a heat exchange fluid for geothermal heat exchange purposes, wherein the tubing/piping is both in thermal contact with, and is thermally surrounded by, heat conductive grout, and wherein the tubing/piping is situated within all three of a trench, a well/borehole, and a pit.

FIG. 4 is a top view of the sub-surface tubing/piping 9 of a geothermal heat pump system (not shown in full detail as geothermal heat pump systems are well understood by those skilled in the art) used for transmission of a heat exchange fluid (not shown herein) for geothermal heat exchange purposes, wherein the tubing/piping 9 is both in thermal contact with and is thermally surrounded by, heat conductive grout 4, and wherein the tubing/piping 9 is situated within all three of a trench 10, a well/borehole 2, and a pit 11. The sub-surface geothermal heat pump system has a supply line 13 entering the sub-surface heat exchange tubing/piping 9, and an exiting return line 14 leaving the sub-surface heat exchange tubing/piping 9. The direction of the heat exchange fluid (not shown herein) flow is shown by arrows 15. The heat exchange fluid (not shown herein) is equally dispersed into multiple tubes/pipes 9 within the pit 11 by means of distributors 16, which are well understood by those skilled in the art. Earth 5 surrounds all of the sub-surface heat exchange tubing/piping 9.

Figure 5:
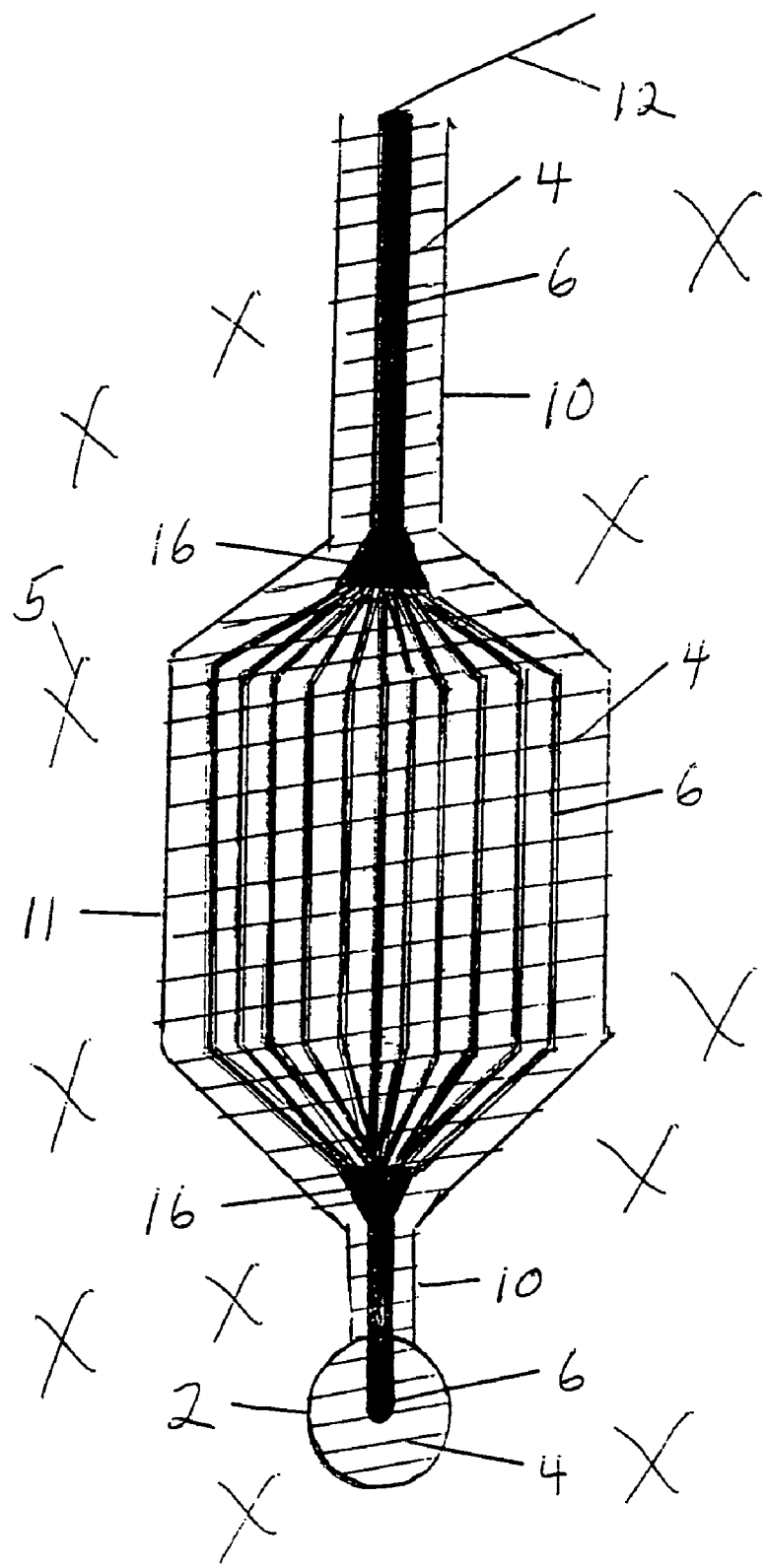
FIG. 5 is a top view of the sub-surface metal grounding rods of an electrical grounding system used for dissipating unwanted electrical currents into the ground/earth, wherein the rods are in at least one of electrical contact with, and are electrically surrounded by, electrically conductive grout, and wherein the rods are situated within all three of a trench, a well/borehole, and a pit.

FIG. 5 is a top view of the sub-surface metal grounding rods 6 of an electrical grounding system (not shown in full detail as electrical grounding systems are well understood by those skilled in the art) used for dissipating unwanted electrical currents into the ground/earth 5, wherein the rods 6 are in at least one of electrical contact with, and are electrically surrounded by, electrically conductive grout 4, and wherein the rods 6 are situated within all three of a trench 10, a well/borehole 2, and a pit 11. The unwanted electrical currents (not shown herein) are dispersed into the earth 5 into multiple metal grounding rods 6 by means of distributors 16, which are well understood by those skilled in the art. The unwanted electrical currents are transmitted to the metal grounding rod 6 by means of an electrical conducting wire 12, as is well understood by those skilled in the art.

Thus, although there have been described particular embodiments of the present invention of a new and useful Cemetitious Grout and Methods of Using Same, it is not intended that such references be construed as limitations upon the scope of this invention except as set forth in the following claims.

What is claimed is:

1. A cementitious grout comprising:
    a cement;
    water;
    a superplasticizer;
    a silica sand having a particle size of 75 to 2360 micrometers; and
    a metal grit having a particle size of 75 to 2360 micrometers.

2. The cementitious grout of claim 1, in which the metal grit comprises a non-oxidizing metal.

3. The cementitious grout of claim 1, in which the metal grit comprises at least one metal selected from the group of metals consisting of stainless steel, magnesium, and titanium.

4. The cementitious grout of claim 1, in which the water has a pH of 5.5 to 11.

\* \* \* \* \*